(12) United States Patent
Longhi et al.

(10) Patent No.: US 12,128,707 B2
(45) Date of Patent: Oct. 29, 2024

(54) WHEEL OF A VEHICLE

(71) Applicant: FERRARI S.p.A., Modena (IT)

(72) Inventors: Daniel Longhi, Modena (IT); Thierry Annequin-Digond, Modena (IT); Alberto Bodini, Modena (IT)

(73) Assignee: FERRARI S.P.A., Modena (IT)

( * ) Notice: Subject to any disclaimer, the term of this patent is extended or adjusted under 35 U.S.C. 154(b) by 571 days.

(21) Appl. No.: 17/380,608

(22) Filed: Jul. 20, 2021

(65) Prior Publication Data

US 2022/0024248 A1   Jan. 27, 2022

(30) Foreign Application Priority Data

Jul. 23, 2020 (IT) .................. 102020000017878

(51) Int. Cl.
*B60B 1/06* (2006.01)
*B60B 27/00* (2006.01)

(52) U.S. Cl.
CPC .............. *B60B 27/00* (2013.01); *B60B 1/06* (2013.01)

(58) Field of Classification Search
CPC ........... B60B 1/06; B60B 3/007; B60B 27/00; B60B 2900/111; B60B 2900/133; B60B 2900/311
See application file for complete search history.

(56) References Cited

U.S. PATENT DOCUMENTS

| | | | |
|---|---|---|---|
| 9,375,976 B1 | 6/2016 | Liu et al. | |
| 2002/0158504 A1* | 10/2002 | Ito | B22D 15/005 |
| | | | 301/65 |
| 2011/0241415 A1* | 10/2011 | Mikura | B60B 1/08 |
| | | | 301/64.102 |
| 2017/0136811 A1* | 5/2017 | Müller | B60B 1/08 |

FOREIGN PATENT DOCUMENTS

| | | |
|---|---|---|
| EP | 2495110 A1 | 9/2012 |
| EP | 3650243 A1 | 5/2020 |
| FR | 2904789 A1 | 2/2008 |

OTHER PUBLICATIONS

Search Report for Italian Application No. 102020000017878 completed Dec. 17, 2020, 7 pages.

* cited by examiner

*Primary Examiner* — S. Joseph Morano
*Assistant Examiner* — Emily G. Castonguay
(74) *Attorney, Agent, or Firm* — CANTOR COLBURN LLP

(57) ABSTRACT

A wheel of a vehicle and having: a central hub; a peripheral ring, on which a tire can be fitted; and a series of spokes, which are arranged radially and connect the peripheral ring to the central hub. Each spoke has three initial branches, which are distinct and separate from one another, originate from different portions of the central hub and, at a given distance from the central hub, join one another so as to form one single central branch, which ends in the peripheral ring.

15 Claims, 6 Drawing Sheets

WHEEL OF A VEHICLE

CROSS-REFERENCE TO RELATED APPLICATIONS

This Patent Applications claims priority from Italian Patent Application No. 102020000017878 filed on Jul. 23, 2020, the entire disclosure of which is incorporated herein by reference.

TECHNICAL FIELD

The invention relates to a wheel of a vehicle.

PRIOR ART

The wheel connecting the tire to the vehicle. A wheel is supposed to be as light as possible, for wheel rim is part of the unsprung mass and, when the total unsprung mass increases, the inertia of the suspensions increases as well, thus forcing the suspensions to handle greater weights, which makes them become less reactive, hence increasing the difficulties in preserving an ideal grip.

Furthermore, when the mass of the wheel increases, the rotational inertia increases (thus increasing the resistance of the wheel to changing its direction) with effects on the steering promptness and there also is an increase in the resistance of the wheel to changing its rotary acceleration both while braking and while accelerating with effects on the braking and accelerating promptness.

Traditionally, in order to lighten the wheel, the wheel is made of a light alloy (an aluminium-based alloy or a magnesium-based alloy, which is more expensive and lighter).

Recently, manufacturers started suggesting the use of wheel made of a composite material and, in particular, of carbon fibre, which allows for very light wheels (the weight reduction compared to similar light alloy wheels amounts to approximately 25-45%). However, a composite material wheel, besides having a very high manufacturing cost, can be subjected to lesions, which jeopardize the structural integrity thereof without any evident sign on the outside, since composite materials (unlike metal materials) are not capable of plastically deforming; for example, a wheel could be damaged following a lateral impact with the edge of a sidewalk without immediately showing any kind of deformation (hence, without giving any "preventive warning" of its damaged state) and could subsequently yield (collapse) because of a stress-induced breaking when the road vehicle is driving at a high speed. As a consequence, the use of composite material wheels poses significant problems in terms of safety, due to the fact that a damaged composite material wheel (i.e. a wheel with structural damages on the inside) seems to be completely intact on the outside and does not cause any problem at low and medium speeds, except for that fact that it can yield (collapse) because of a stress-induced breaking when the road vehicle is driving at a high speed.

Documents U.S. Pat. No. 9,375,976B1, FR2904789A1, EP2495110A1 and EP3650243A1 provide some examples of a wheel of a vehicle.

DESCRIPTION OF THE INVENTION

The object of the invention is to provide a wheel of a vehicle, said wheel having a small mass despite having, at the same time, a high torsional stiffness and a high mechanical efficiency (determined as the ratio between the vertical load the wheel is capable of standing and the mass of the wheel).

According to the invention, there is provided a wheel of a vehicle according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
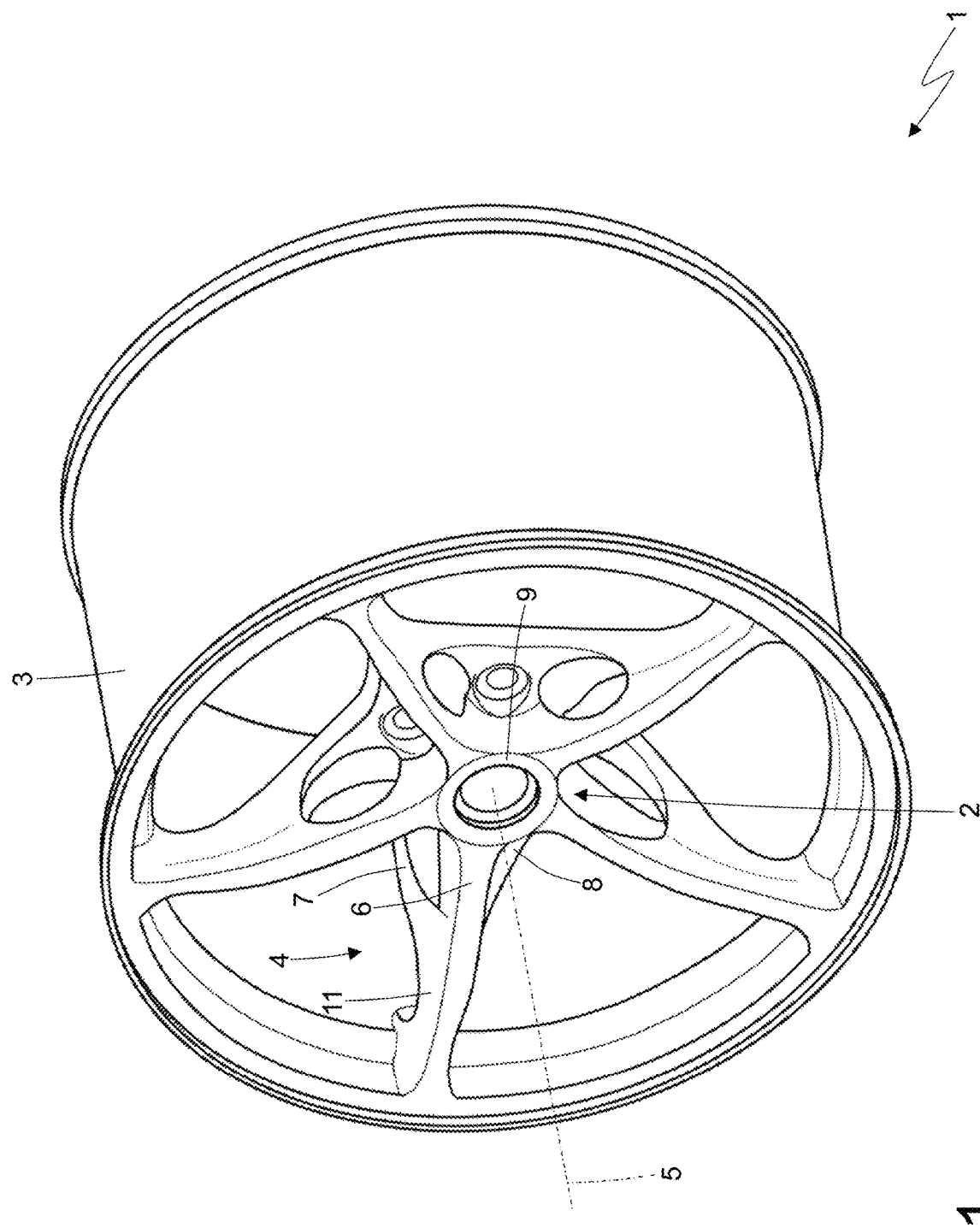
FIG. 1 is a perspective view of a wheel according to the invention.
Figure 2:
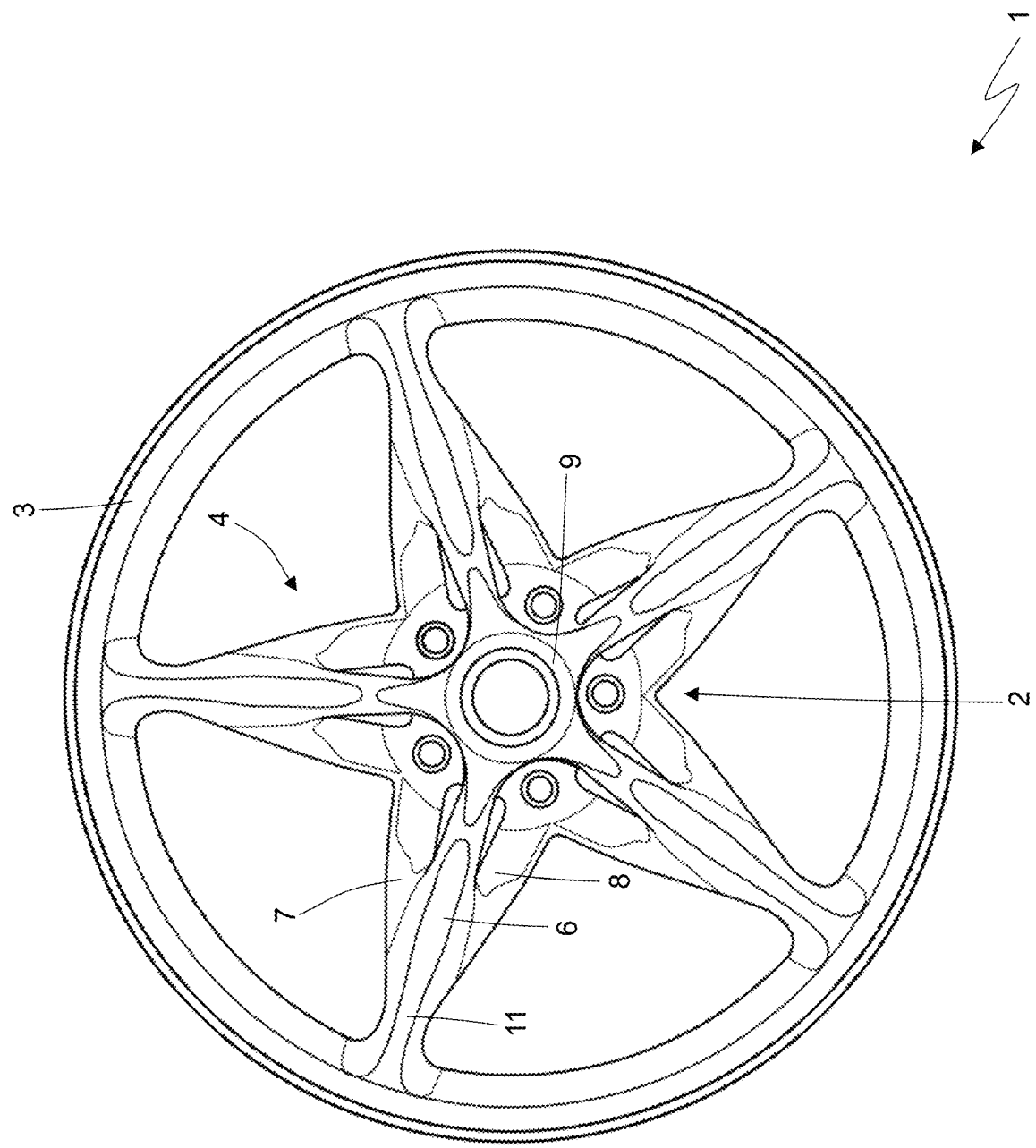
FIG. 2 is a front view of the wheel of FIG. 1.
Figure 3:
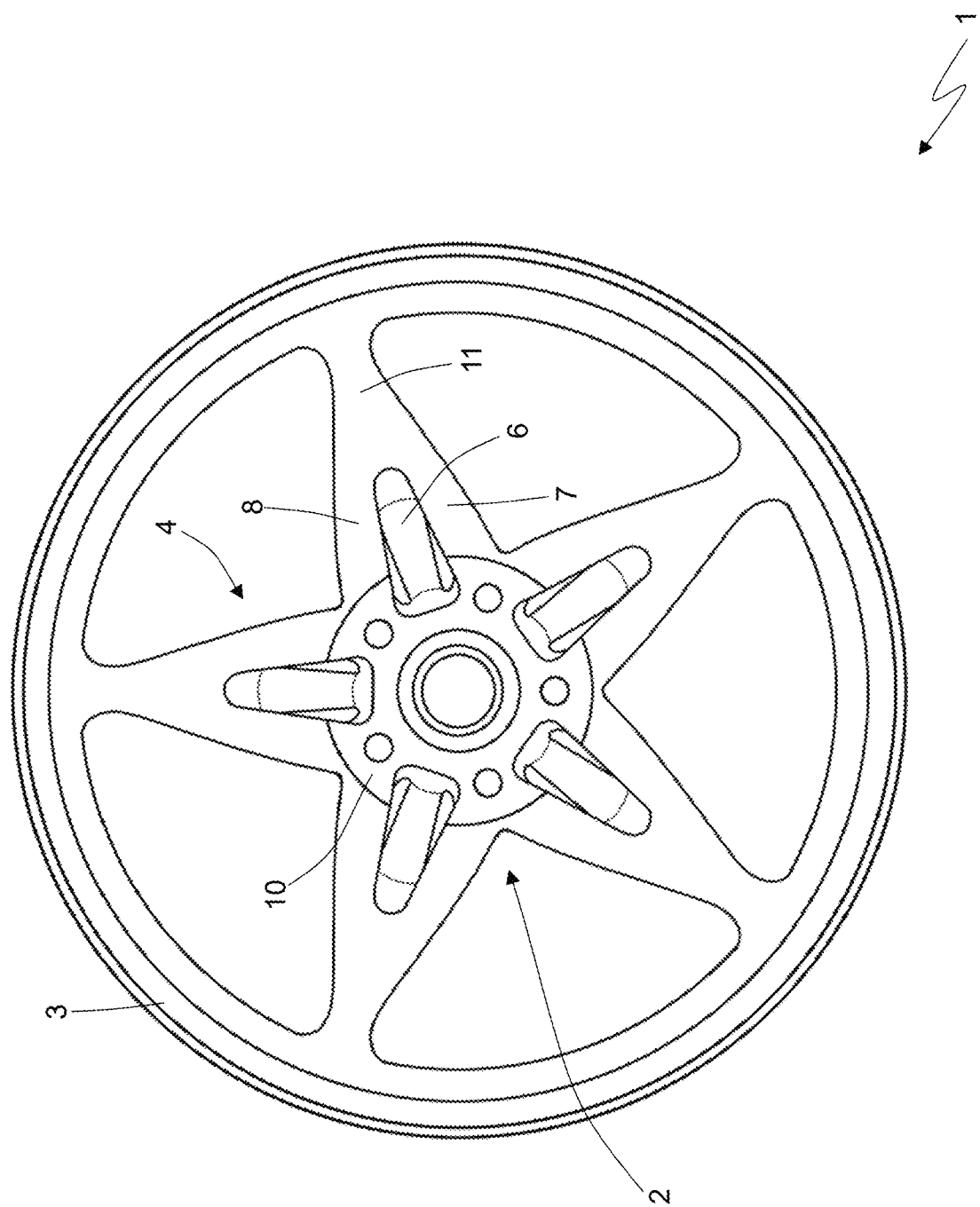
FIG. 3 is a rear view of the wheel of FIG. 1.

In FIGS. 1, 2 and 3, number 1 indicates, as a whole, a wheel of a vehicle; namely, the wheel 1 is suited to receive a corresponding tire and is the element connecting the tire to the vehicle.

The wheel 1 comprises a central hub 2, which is fixed to a suspension of the vehicle, a properly shaped peripheral ring 3, on which the tire is directly fitted, and a series of five spokes 4, which are arranged radially and connect the peripheral ring 3 to the central hub 2. In particular, an inner wall of the central hub 2 (visible in FIG. 3) is configured to rest against an outer wall of a bell of a disc brake, which, in turn, is supported in a rotary manner (with the interposition of bearings) by a suspension of the vehicle; the central hub 2 has five through holes (but their number and/or their arrangement could be different), through which five corresponding screws are arranged, which are screwed into five threaded holes obtained in the bell of a disc brake.

The wheel 1 has a central symmetry axis 5, around which the wheel 1 rotates in use.

Figure 4:
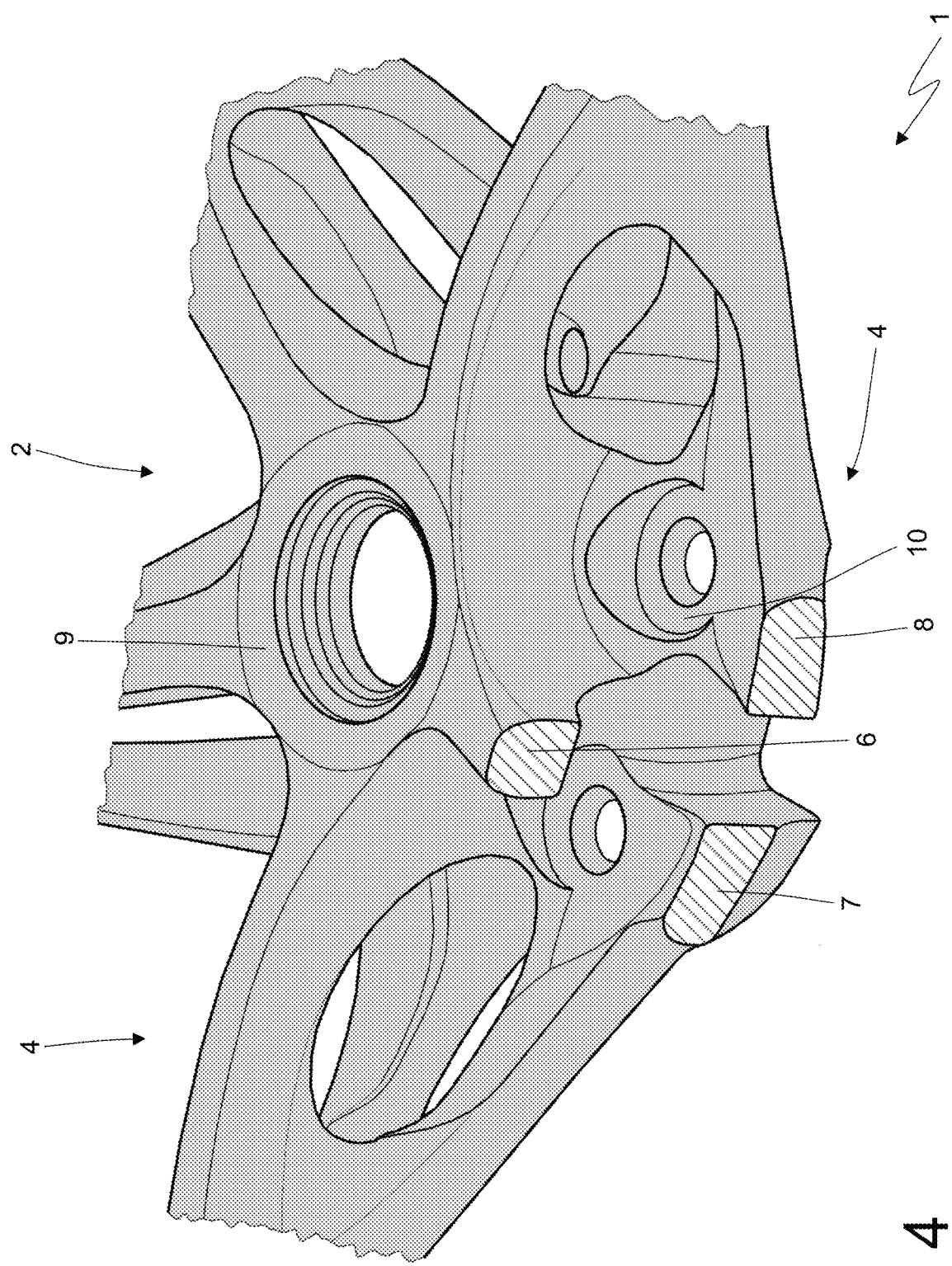
FIGS. 4 and 5 are two different sectional views of a spoke of the wheel of FIG. 1.
Figure 5:
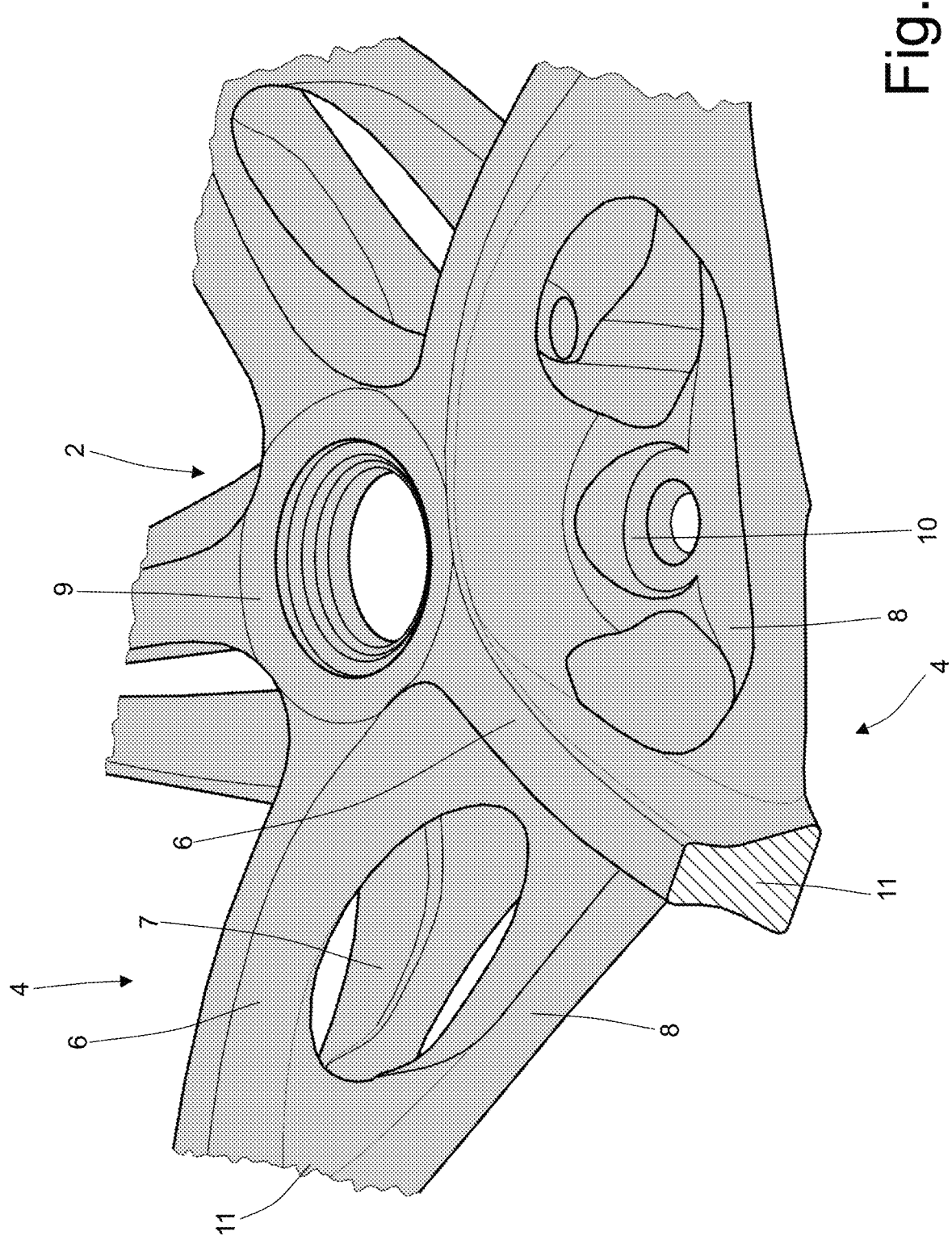

According to FIGS. 4 and 5, each spoke 4 comprises three initial branches 6, 7 and 8, which are distinct and separate from one another, originate from different portions 9 and 10 of the central hub 2 and, at a given distance from the central hub 2, join one another so as to form one single final branch 11, which ends in the peripheral ring 3.

In other words, each spoke 4 starts from the central hub 2 with three separate elements (the three initial branches 6, 7 and 8) and ends in the peripheral ring 3 with one single element (the final branch 11) formed by the joining of the three elements (the three initial branches 6, 7 and 8).

In particular, in each spoke 4, each initial branch 6, 7 or 8 is separated from the other two initial branches 6, 7 or 8 by an empty space; namely, between each initial branch 6, 7 or 8 and the other two initial branches 6, 7 or 8 there is a non-zero distance, in which an empty space is defined.

In each spoke 4, an outer initial branch 6 originates from an outer portion 9 of the central hub 2, whereas two inner initial branches 7 and 8 originate from an inner portion 10 of the central hub 2, which is arranged axially (i.e. along the central axis 5) more on the inside than the outer portion 9 and at a given axial distance from the outer portion 9. In other words, the central axis 2 (coaxial to the central axis 5) has an approximately cylindrical shape having a base, which is arranged on the outside (i.e. towards the outside of the wheel 1) and constitutes the outer portion 9, and an opposite base, which is arranged on the inside (i.e. towards the inside of the wheel 1) and constitutes the inner portion 10. Hence, the portions 9 and 10 make up the two axially opposite ends of the central hub 2.

According to FIG. 4, in each spoke 4, the two inner initial branches 7 and 8 have a cross section with an approximately rectangular shape (which, among other things, has rounded corners compared to a perfectly rectangular shape) having the main sides oriented radially (i.e. perpendicularly to the central axis 5) and the small sides oriented axially (i.e. parallel to the central axis 5). The position and the shape of the two inner initial branches 7 and 8 allows the torsional stiffness of the wheel 1 to be significantly increased.

According to FIG. 4, in each spoke 4, the outer initial branch 6 has a cross section with an approximately square shape (which, among other things, has rounded corners compared to a perfectly square shape) having four sides approximately with the same size.

According to FIG. 5, in each spoke 4 and in cross section, the final branch 11 has a complex shape (which reminds of the shape of an "Omega") consisting of the overlap of an isosceles trapezium arranged axially more on the inside (of the wheels 1) and a rectangle, in particular a square, arranged axially more on the outside (of the wheel 1).

According to a preferred embodiment shown in FIGS. 4 and 5, in each spoke 4, the two inner initial branches 7 and 8 are inclined towards the outside and the outer initial branch 6 is inclined towards the inside; hence, the initial branches 6, 7 and 8 axially meet approximately halfway in order to form the final branch 11.

Figure 6:
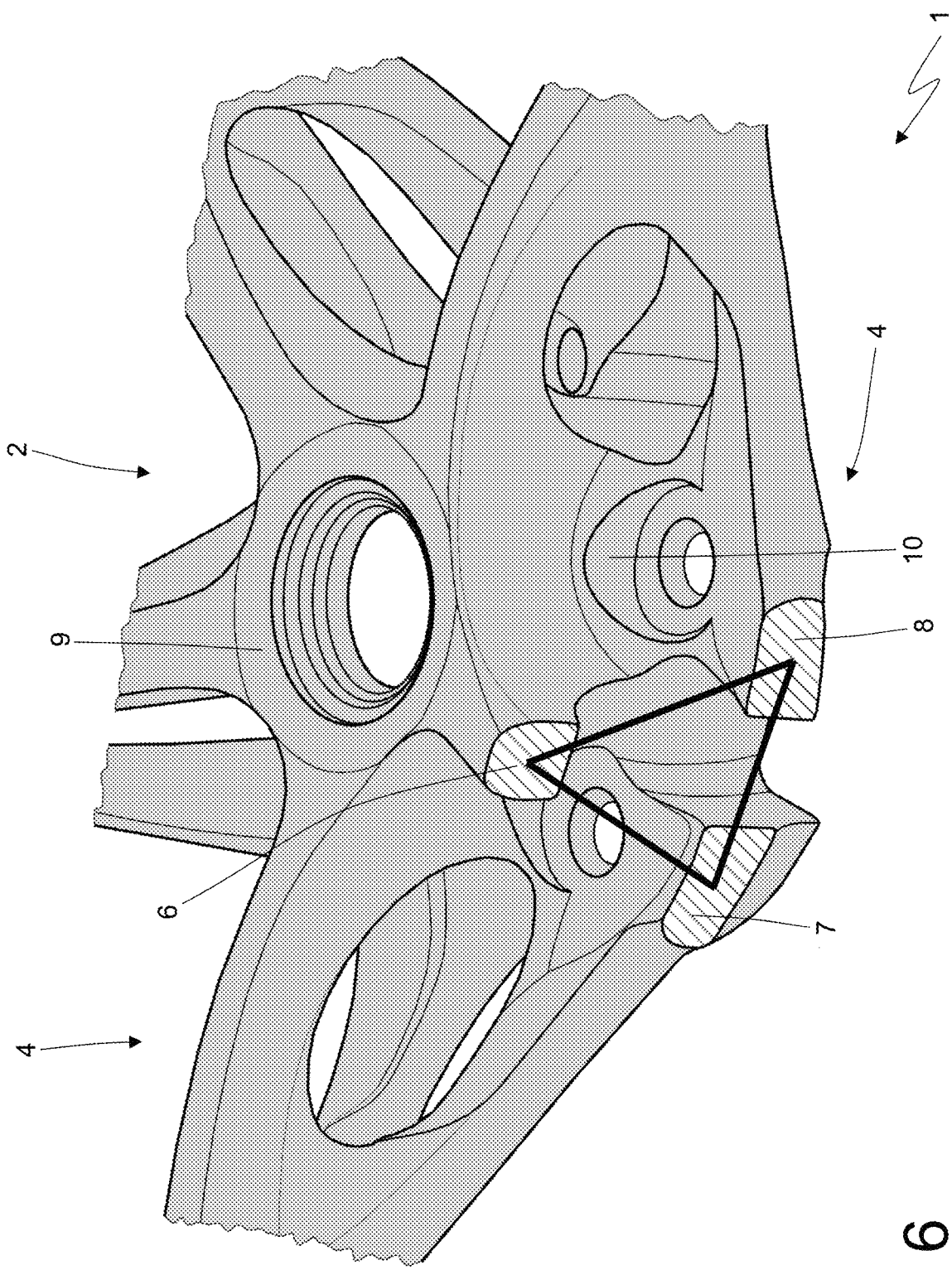
FIG. 6 reproduces what is shown in FIG. 4 with the addition of an imaginary triangle formed by three branches of a spoke.

According to a preferred embodiment shown in FIG. 6, in each spoke 4 and in cross section, the three initial branches 6, 7 and 8 (or, better said, the centres of gravity of the three initial branches 6, 7 and 8) are the vertices of a triangle, in particular of an isosceles triangle or, preferably, of an equilateral triangle.

According to a preferred embodiment shown in FIGS. 2 and 3, in each spoke 4, the outer initial branch 6 is parallel to a radial direction originating from the central rotation axis 5 and is aligned with the final branch 11 (which is also parallel to the radial direction). According to a preferred embodiment shown in FIGS. 2 and 3, in each spoke 4, the two inner initial branches 7, 8 are inclined relative to the radial direction originating from the central rotation axis 5 (i.e. form acute angles with the radial direction), are inclined relative to the final branch 11 (i.e. form acute angles with the final branch 11) and form, at the front (i.e. in a front view) and with the final branch 11, the shape of a WY".

According to FIGS. 1-5, in each spoke 4, the two inner initial branches 7 and 8 are separated from one another by an empty space, which is circumferentially aligned with the outer initial branch 6; as a consequence, in each spoke 4, the outer initial branch 6 is also visible in the rear view of the wheel 1 (shown in FIG. 3) between the two corresponding inner initial branches 7 and 8.

Generally speaking, better results are obtained with a number of spokes 4 ranging from five to ten.

In the embodiment shown in the accompanying figures, the entire wheel 1 is exclusively made of light metal alloy (typically, an aluminium-based alloy). Alternatively, the wheel 1 could be made partly of a composite material (in particular, carbon fibre, but any other type of composite material—for example an aramid fibre-based material— could be used) and partly of a light metal alloy; in particular, the spokes 4 and a style band are made of a light metal alloy and are bolted or glued to a peripheral ring 3 made of a composite material.

The light metal alloy parts of the wheel 1 (or the entire wheel 1) can be manufactured through casting, forging or additive manufacturing.

The embodiments described herein can be combined with one another, without for this reason going beyond the scope of protection of the invention.

The wheel 1 described above has numerous advantages.

First of all, the wheel 1 described above has a particular geometry of the spokes 4, which leads to a mass/stiffness ratio that is close to the one of a similar wheel made of a composite material (carbon fibre), though without being affected by the problems of a similar wheel made of a composite material (for example, high manufacturing costs, style limits and safety problems). As a consequence, the wheel 1 described above has, at the same time, a relatively small mass and a high torsional stiffness.

Furthermore, the wheel 1 described above has a high mechanical efficiency (determined as the ratio between the vertical load the wheel 1 is capable of standing and the mass of the wheel 1). In particular, the wheel 1 described above stands 30%-40% more of load compared to a similar traditional wheel having the same mass.

Basically, the wheel 1 described above maximizes three aspects: performances (thanks to the high stiffness), mass (namely, the wheel 1 described above is particularly light) and noise (the high torsional stiffness minimizes the noises generated by the wheel 1 in use).

Finally, the wheel 1 described above is simple and economic to be manufactured, since it can be manufactured with standard production techniques of the wheel industry (casting and forging) combined with subsequent mechanical chip-removal machining (especially in order to dig out and remove the metal material located between the three initial branches 6, 7 and 8).

LIST OF THE REFERENCE NUMBERS OF THE FIGURES

1 wheel
2 central hub
3 peripheral ring
4 spokes
5 central axis
6 outer initial branch
7 inner initial branch
8 inner initial branch
9 outer portion
10 inner portion
11 final branch

The invention claimed is:
1. A wheel (1) of a vehicle and comprising:
a central hub (2);
a peripheral ring (3), on which a tire can be fitted; and
a series of spokes (4), which are arranged radially and connect the peripheral ring (3) to the central hub (2);
wherein each spoke (4) comprises three initial branches (6, 7, 8), which are distinct and separate from one another, originate from different portions (9, 10) of the central hub (2) and, at a given distance from the central hub (2), join one another so as to form one single final branch (11), which ends in the peripheral ring (3).

2. The wheel (1) according to claim 1, wherein, in each spoke (4), each initial branch (6, 7, 8) is separated from the other two initial branches (6, 7, 8) by an empty space.

3. The wheel (1) according to claim 1, wherein, in each spoke (4):
an outer initial branch (6) originates from an outer portion (9) of the central hub (4); and
two inner initial branches (7, 8) originate from an inner portion (10) of the central hub (4), which is arranged axially more on an inside than the outer portion (9) and at a given axial distance from the outer portion (9).

4. The wheel (1) according to claim 3, wherein, in each spoke (4), the two inner initial branches (7, 8) have a cross section with an approximately rectangular shape having the main sides oriented radially and the small sides oriented axially.

5. The wheel (1) according to claim 3, wherein, in each spoke (4), the outer initial branch (6) has a cross section with an approximately square shape.

6. The wheel (1) according to claim 3, wherein, in each spoke (4), the two inner initial branches (7, 8) are separated from one another by an empty space, which is circumferentially aligned with the outer initial branch (6).

7. The wheel (1) according to claim 3, wherein, in each spoke (4), the two inner initial branches (7, 8) are inclined towards an outside and the outer initial branch (6) is inclined towards an inside.

8. The wheel (1) according to claim 3, wherein the outer portion (9) and the inner portion (10) are the two axially opposite ends of the central hub (4).

9. The wheel (1) according to claim 3, wherein, in each spoke (4), the outer initial branch (6) is parallel to a radial direction originating from a central rotation axis (5) and is aligned with the final branch (11).

10. The wheel (1) according to claim 3, wherein, in each spoke (4), the two inner initial branches (7, 8) are inclined relative to a radial direction originating from a central rotation axis (5), are inclined relative to the final branch (11) and form, at a front and with the final branch (11), the shape of a "Y".

11. The wheel (1) according to claim 1, wherein, in each spoke (4) and in cross section, the final branch (11) has a complex shape consisting of an overlap of an isosceles trapezium arranged axially more on an inside and a rectangle arranged axially more on an outside.

12. The wheel (1) according to claim 1, wherein, in each spoke (4) and in cross section, the three initial branches (6, 7, 8) are vertices of a triangle.

13. The wheel (1) according to claim 1, wherein, in each spoke (4) and in cross section, the three initial branches (6, 7, 8) are vertices of an equilateral triangle.

14. The wheel (1) according to claim 1, wherein, in each spoke (4) and in cross section, centers of gravity of the three initial branches (6, 7, 8) are vertices of a triangle.

15. The wheel (1) according to claim 1, wherein, in each spoke (4) and in cross section, centers of gravity of the three initial branches (6, 7, 8) are vertices of an equilateral triangle.

* * * * *